United States Patent Office 3,547,544
Patented Dec. 15, 1970

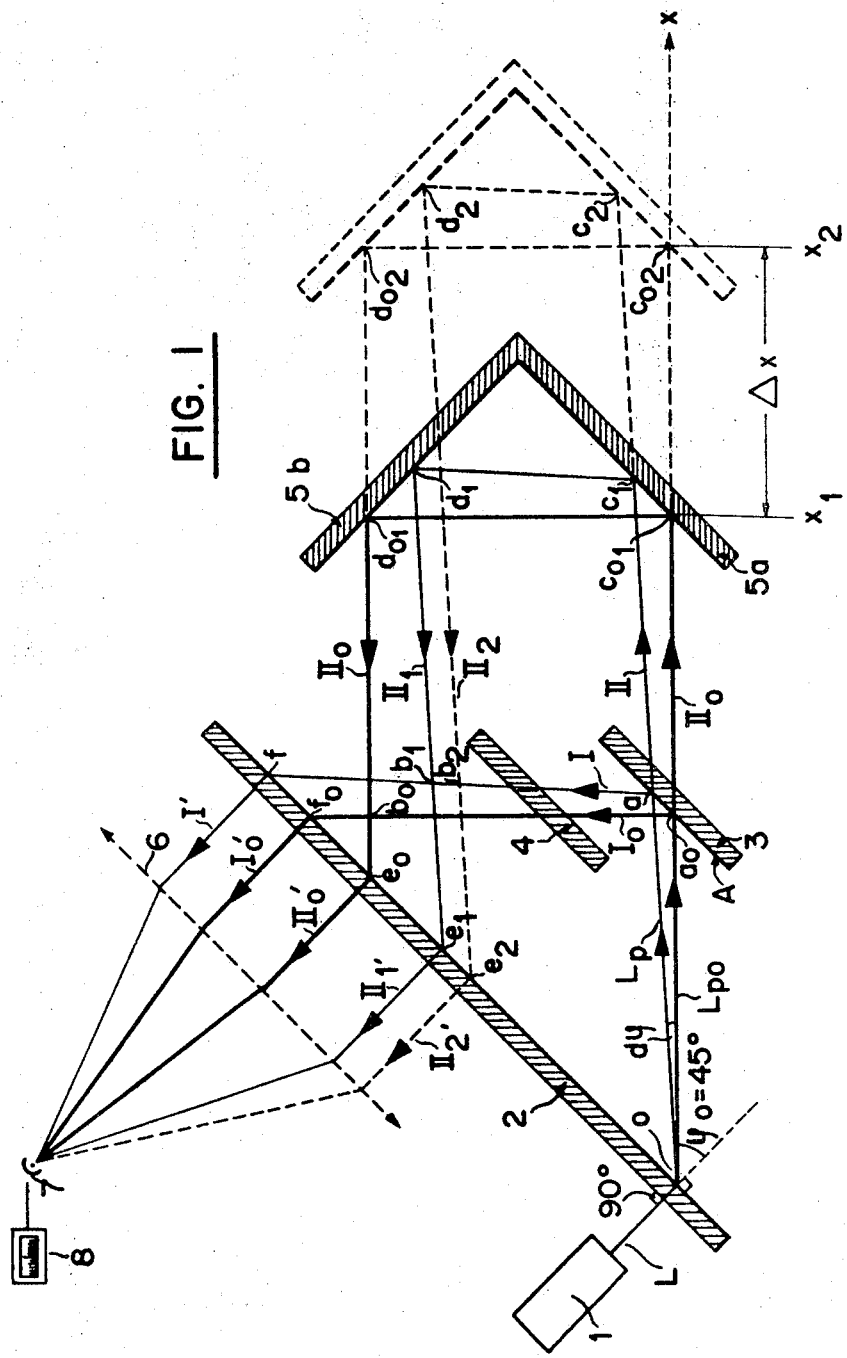

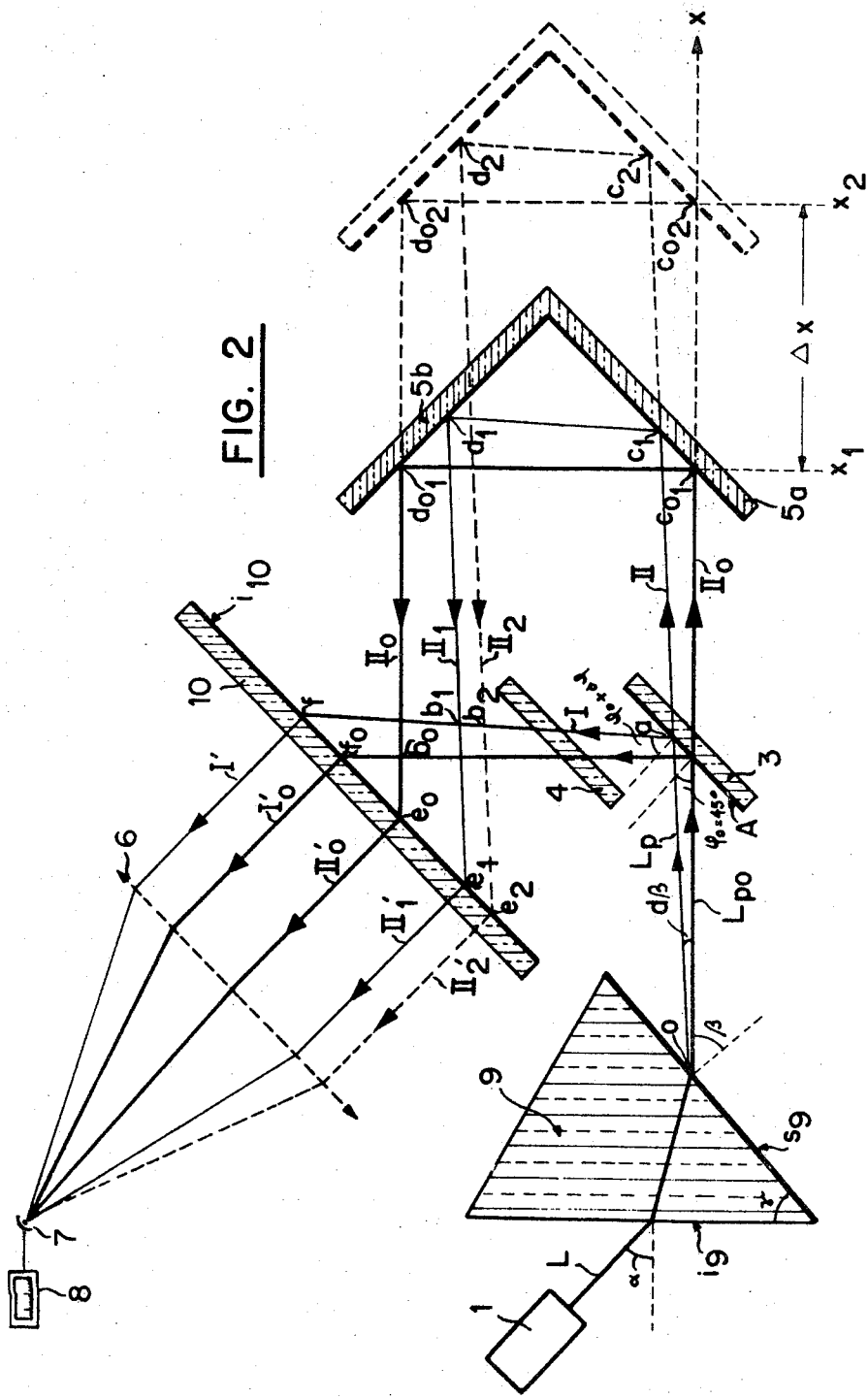

3,547,544
APPARATUS FOR MEASURING LENGTHS BY OPTICAL INTERFEROMETRY
Adolf Steinemann, Moillesulaz, Geneva, and Jack Ruefenacht, Lausanne, Switzerland, assignors to Societe Genevoise d'Instruments de Physique, Geneva, Switzerland
Filed Aug. 8, 1967, Ser. No. 659,165
Claims priority, application Switzerland, Aug. 9, 1966, 11,468/66
Int. Cl. G01b 9/02
U.S. Cl. 356—113
7 Claims

ABSTRACT OF THE DISCLOSURE

Briefly described, the apparatus comprises a device, such as a laser effect generator, for producing a main beam of collimated monochromatic high intensity light which is then refracted or diffracted. A semi-transparent mirror is arranged to receive this main beam at an angle of incidence of 45° for particular conditions of atmospheric temperature and pressure. When these conditions vary this angle of incidence will alter slightly since the refractive index of air depends upon the atmospheric conditions but the arrangement of the apparatus is such that these variations will not produce measurement errors. The semi-transparent mirror, which is fixed, divides the beam into two parts, the first being reflected and the second being transmitted. A mirror assembly comprising two mirrors at right angles mounted on a carriage which is movable along a path in the direction of the main beam (at 45° to the fixed mirror) is arranged to receive this second, transmitted part, and reflect it back parallel to said path. A collimator is arranged to receive both first and second parts of the beam, the plane of collimation being parallel to the fixed mirror, and to transmit both parts normally to this plane. An optical system focuses both parts to a point where there are means for detecting and counting interference fingers.

For measuring, the movable mirror assembly is shifted through the distance to be measured and it follows that, while the first reflected part of the beam remains constant in length, the path of the second transmitted part lengthens (or shortens) as the mirror assembly moves and the interference fringes can be counted as they appear at the focal point of the optical system. The number of fringes counted is proportional to the distance traversed by the movable mirror assembly.

BACKGROUND OF THE INVENTION

The invention pertains to the art of measuring lengths of optical interferometry.

Interferometers known as the "de Michelson" type have been used for a similar method of measuring. The practical application of these interferometers does however meet a major difficulty, due to the variation of the refractive index of air as a function of the ambient conditions, that is to say, as a function of the ambient atmospheric pressure, temperature and the presence of vapour. This variation in index introduces errors into the measurements and these errors can be of the order of $10^{-5}$ to $10^{-4}$ of the lengths to be measured. Two solutions had been proposed for overcoming this disadvantage. The first consists in arranging the interferometer in a chamber, in which the air is kept at constant temperature and pressure. The second solution consists in using an installation with which it is possible to detect, at the time of measurement, the variations in the pressure and the temperature of the ambient air and as a consequence to correct electronically the value of the length which is measured. It can easily be seen that these two solutions involve the use of a complicated auxiliary equipment.

The present invention provides an interferometry method and also an apparatus for carrying this method into effect, which enable the aforesaid disadvantage to be obviated, that is to say, permit the measurement of lengths to be effected in a manner substantially independent of any variation in the refractive index of the medium through which the light beams pass.

As is known, the product of the length of the geometric path and the refractive index of the medium traversed defines the optical path of a beam. In the present invention, it is proposed to effect the measurement of lengths in a manner substantially independent of any random variation in the refractive index of the ambient air, this being achieved by modifying the geometric paths of the beams as a function of variations of the said index.

SUMMARY

It is an essential object of the invention to provide apparatus for measuring lengths by optical interferometry, the apparatus comprising:

(a) Means for producing a main beam of collimated, monochromatic light;

(b) A fixed plane semi-transparent mirror;

(c) Means for directing said main beam onto said plane mirror at an angle of incidence of 45° for a given value of the refractive index of air, whereby said plane mirror transmits one part of said main beam along a linear path and reflects another part of said main beam;

(d) A mirror assembly movable along said linear path in accordance with the distance to be measured and having two plane mirrors, one parallel to said fixed mirror and the other perpendicular thereto, said one mirror being arranged to receive said one part of said beam and reflect it onto said other mirror which is arranged to return said one part of the beam parallel to said linear path;

(e) A collimator arranged to receive both said other part of the beam from said fixed mirror and said one part of the beam from said other mirror of the mirror assembly, the plane of collimation being parallel to the plane of said fixed mirror;

(f) An optical system for causing the parallel beams leaving the collimator to converge to a point, and (g) Means for detecting and counting the interference fringes at said point.

It is another essential object of the invention to provide a method of measuring length by optical interferometry, the method comprising directing a beam of controlled monochromatic light at an angle of incidence of 45° for a given value of the refractive index of the air towards a fixed, semitransparent plane mirror serving to separate this beam into one part transmitted along a linear path and another part reflected from the face of said mirror to a collimator, moving a mirror assembly along said linear path in accordance with the distance to be measured, the mirror assembly having two plane mirrors one parallel to said fixed mirror and the other perpendicular thereto and said one part of the beam being reflected by said one mirror onto said other mirror and thence back parallel to said linear path to said collimator, whose plane of collimation is parallel to the plane of said fixed mirror, converging to a point by means of an optical system the parallel beams leaving the collimator and detecting and counting at said point the interference fringes arising from movement of said mirror assembly.

The beam producing means may be a laser effect generator, of the Ne–He gas type for example. The directing means may either be a refraction device or a plane diffraction grating disposed parallel to the fixed mirror and designed to receive the main beam at normal incidence and to emit it at an angle of 45° to the normal to the plane of the grating. The collimator may be a plane grating disposed parallel to the fixed mirror and this grating could serve both as the directing means at one part and the collimator at another part thereof. The detection and counting means may comprise at least one photoelectric cell disposed behind the optical system at said point and an additive-subtractive electronic counter co-operating with said cell to count the number of fringes arising from movement of the mirror assembly. A set of optical filters may be associated with the detector for eliminating any parasitic light and a compensating plate could be interposed between the fixed mirror and the collimator. This would have the same optical characteristics as the transparent part of the fixed mirror, the reflected part of the main beam being thereby subjected to the same modification in its optical path as that of the transmitted part.

BRIEF DESCRIPTION OF THE DRAWINGS

Two embodiments of an apparatus for carrying the method according to the invention into effect are shown diagrammatically and by way of example in the accompanying drawings, in which:

FIG. 1 is a diagram of a first embodiment of apparatus for measuring lengths by optical interferometry, and FIG. 2 is a diagram of a second embodiment of apparatus for measuring lengths by optical interferometry.

DESCRIPTION OF THE PREFERRED EMBODIMENTS

The apparatus shown in FIG. 1 comprises a laser effect generator 1, which will hereinafter be referred to by the term "laser," serving as a source of collimated, monochromatic, coherent light at high intensity and emitting a beam L directed with normal incidence towards a plane diffraction grating 2.

In the present case, the laser 1 is of the Ne–He gas type and continuously emits the light beam L, of which the wavelength has a mean value $\lambda_0$ of about $0.633\mu$ in air at 20° C. and 760 mm. Hg. These values will be considered hereinafter as being the average conditions provided for the operation of the apparatus.

The grating 2 is arranged in such a way that it produces, under the said average conditions, a diffracted beam $I_{po}$ leaving at an angle of 45° with the normal to the plane of the grating 2 and forming the main beam.

The main beam $L_{po}$, as well as all the beams derived from the latter and likewise carrying the index 0, will hereinafter be referred to by the term "reference beam," because they correspond to the beams obtained under the average working conditions as indicated above.

The diffracted main beam $L_{po}$ falls on a semi-transparent mirror 3, formed by a plane glass plate having parallel faces, of which the incidence surface A is covered with a metallic layer, for example consisting of thin aluminum. This mirror 3, which is mounted parallel to the plate of the grating 2 so as to receive the said reference main beam $L_{po}$ at an angle of incidence of 45° serves to separate this beam $L_{po}$ into two parts, namely, into a first reflected beam $I_0$ and into a second transmitted beam $II_0$. The first beam $I_0$ passes through a compensating glass plate 4, following the path $a_0-b_0-f_0$ and encounters another part of the grating 2, where it is diffracted in such a way as to produce a beam $I'_0$, leaving normally with respect to the plane of the said grating. The plate 4 has the same optical characteristics as the plate of the mirror 3, so that the optical path of the first beam $I_0$ is modified to the same extent as the optical path of the second beam $II_0$ is modified by the passage through the transparent part of the said mirror 3.

The second transmitted reference beam $II_0$ is subjected to a double reflection by means of a movable mirror assembly having two mirrors 5a and 5b disposed at right angles, so that the reflecting face of the mirror 5a is parallel and that of the mirror 5b is perpendicular to the plane of the semitransparent mirror 3. Thus, for the position $x_1$ of the mirrors 5a, 5b (see FIG. 1), the second transmitted beam $II_0$ follows the path $a_0-c_{01}-d_{01}-b_0-e_0$, so that it returns parallel to itself and falls on the grating 2, where it is diffracted so as to produce a beam $II'_0$ leaving normally in relation to the plane of the said grating. The part of the said grating on which the beams $I_0$ and $II_0$ fall thus serves the purpose of a collimator. The parallel beams $I'_0$, $II'_0$ leaving the said part of the grating 2 are reunited by an optical system 6 and are then picked up by a detector 7 comprising two photo-electric cells and provided with a set of filters (not shown) permitting any parasitic light to be eliminated.

The mirrors 5a and 5b are fast with a carriage (not shown) serving to displace them together in a precise manner, parallel to themselves, along a linear path represented in FIG. 1 by the axis $x$ forming an angle of 45° with the plane of the semi-transparent mirror 3, this axis being disposed in the direction of the reference main beam $L_{po}$ and of the beam $II_0$.

The displacement of the mirrors 5a, 5b by a distance $\Delta x$ adds to the path of the transmitted reference beam $II_0$ the paths $c_{01}-c_{02}$ and $d_{02}-d_{01}$. As indicated by the geometrical arrangement of the elements shown in FIG. 1;

$$c_{01}-c_{02}=\Delta x=d_{02}-d_{01}$$

Thus, the result of the said displacement is a lengthening by $2.\Delta x$ of the path of the beam $II_0$.

An additive-subtractive electronic counter 8, connected to the detector 7, serves to count the passage of the interference fringes resulting from the displacement of the movable mirrors 5a, 5b.

It is to be noted that, in order to ensure a precise measurement, the fixing of the mirrors 5a, 5b to the carriage and of the semi-transparent mirror 3 to its fixed support must be extremely precise and independent of any variation in the ambient conditions. The fixation means used for this purpose must therefore be formed of a material having a very small coefficient of expansion, as for example "Invar."

Furthermore, in order to ensure a diffraction effect substantially independent of the variations in the temperature of the ambient air, the grating 2 is formed of a material whose coefficient of expansion is very small for the range of temperatures which is visualized for the operation of the apparatus.

The diffraction of a beam falling at normal incidence on a plane grating is described by the following general formula:

$$g \sin \varphi = p\lambda \qquad (1)$$

in which:

$g$ is the spacing of the grating lines, $\varphi$ is the angle formed between one of the diffracted beams leaving the grating and the normal to the exit plane of the said grating, $p$ is the order of diffraction to which the diffracted beam corresponds, $\lambda$ is the wavelength of the light of the diffracted beam.

After having traversed N wavelengths, the wave front of a diffracted beam emerging from the grating is at a distance $r$ from this grating, which is expressed by the equation:

$$r = N\lambda = \frac{N_g}{p} \sin \varphi \qquad (2)$$

The Equation 2 defines a circle of radius $Ng/2_p$ passing through the origin of the diffracted beam. When $\varphi = 45°$, the tangent to the wave front is parallel to the plane of the grating.

The first condition which must be met by the diffraction grating 2 mentioned above is that it should produce a diffracted beam emerging at an angle of 45° under average atmospheric conditions (20° C., 760 mm. Hg). The plane of the grating 2 being parallel to that of the semitransparent mirror 3, the exit angle $\varphi$ of the diffracted beam will thus be equal to its angle of incidence on the mirror 3.

If the numerical values of $\varphi=\varphi_0=45°$ and $$\lambda=\lambda_0=0.633\mu$$

are included in the general Formula 1, there is obtained:

$$\frac{g}{\sqrt{2}}=0.633\ p \qquad (3)$$

Thus the appropriate choice of the spacing $g$ of the grating permits the Equation 3 to be satisfied. In the present case, if the grating 2 has about 224 lines per mm. it is possible to produce a diffracted beam ($L_{p0}$) leaving at 45° and corresponding to the 5th order of diffraction.

When the ambient conditions vary in relation to the average conditions, that is to say, when the refractive index of the air $n \neq n_0$ and $\lambda \neq \lambda_0$, the geometric path of the beams is modified because from the exit angle $\varphi$ of the diffracted beam $L_p$ deviates from its mean value ($\varphi_0=45°$) by an angle $d\varphi$.

The deviation $d\varphi$ depends on $\lambda$ in accordance with the equation:

$$g \sin (45+d\varphi) \frac{g}{\sqrt{2}} (\cos d\varphi + \sin d\varphi) = p\lambda \qquad (4)$$

in which $\lambda$ is only a function of the refractive index $n$ of the air.

The grating 2 receiving the beam L from the laser 1 with normal incidence likewise fulfills the second condition, according to which the deviation ($d\varphi$) from $\varphi_0=45°$, expressed as radians, of the exit angle $\varphi$ of the diffracted beam must be equal to the relative deviation and change of sign $$\left(-\frac{dn}{n_0}\right)$$

of the refractive index of the air, when this index varies with respect to its mean value $n_0$.

This may be demonstrated as follows:

If the Equation 1 is differentiated:
from $$g \sin \varphi = p\lambda$$

there is obtained:

$$g \cos \varphi d\varphi = p d\lambda \qquad (5)$$

thus:

$$\frac{d\lambda}{\lambda} = \frac{\cos \varphi}{\sin \varphi} \cdot d\varphi \qquad (6)$$

for $\varphi=\varphi_0=45°$:

$$d\lambda/\lambda = d\varphi \qquad (7)$$

In view of the fact that $$\lambda_n = \lambda_0 n_0 = \text{constant} \qquad (8)$$

there is obtained $\lambda dn + n d\lambda = 0$ and thus $$\frac{d\lambda}{\lambda} = -\frac{dn}{n} \qquad (9)$$

which gives, according to (7):

$$\frac{d\lambda}{\lambda} = d\varphi = -\frac{dn}{n} \qquad (9)$$

For the deviation with respect to the mean values $\varphi_0$, $n_0$, there is obtained:

$$d\varphi = -\frac{dn}{n_0} \qquad (10)$$

The Equation 10 thus demonstrates that the second condition is satisfied by the grating 2.

It is to be pointed out that the value of the refractive index $n$ of the air can be calculated by means of the formula:

$$n = 1 + \Delta n_0 \frac{P}{P_0} \cdot \frac{T_0}{T} \qquad (11)$$

in which:

$\Delta n_0$ is a parameter depending only on the wavelength $\lambda$,

P and $P_0$ are respectively the pressures of the air and the normal atmospheric pressure ($P_0=760$ mm. Hg), T and $T_0$ are respectively the absolute temperatures of the air and 273° K.

For the wavelength $\lambda=0.6328\mu$, $P=P_0$ and $T=T_0$:

$$n=1.002927$$

For maximum variations of P and T of the order of 10%, the maximum value of the relative variation $dn/n_0$ of the refractive index of the air is smaller than $10^{-4}$. It is thus seen that even for these relatively high variations in temperature and pressure, which constitute the main parameters determining the value of the index $n$, the variation of this index is relatively small.

Consequently $$|d\varphi| = |dn/n| \leqslant 10^{-4} \text{ radians} \qquad (12)$$

Thus the maximum deviation $d\varphi_{max}$ is equal to $10^{-4}$ radians, and this corresponds to about 30 seconds of arc.

The relations (2), (9) and (12) indicated above lead to the conclusion that the wave front, which reaches the mirrors 3 and 5a under the said average conditions, will remain in contact of first order with these mirrors under the slightly different conditions, because these mirrors are parallel to the grating 2. Mathematically, this conclusion results in that the circle or geometrical position defined by the Equation 2 coincides with its tangent for small deviation angles $d\varphi$.

As will be seen from FIG. 1, the paths $a$–$c_1$–$d_1$–$d_1$ and $a$–$b_1$, on the one hand, and $a$–$c_2$–$d_2$–$b_2$ and $a$–$b_2$, on the other hand, form parallelograms.

Thus:

$$a-b_1 = c_1-d_1$$

and $$a-b_2 = c_2-d_2$$

In addition, the geometrical disposition of the elements represented in FIG. 1 shows that $$b_1-e_1 = b_1-f$$
$$b_2-e_2 = b_2-f$$

a variation of the optical path O of $$\Delta O = 2n \cdot (c_1-c_2) \qquad (13)$$

corresponds to the measured length, that is to say, to the displacement $\Delta x$ of the mirrors 5a, 5b.

The beams I and II arriving on the plane of the grating 2 are diffracted so as to produce beams I' and II' leaving normally to the plane of the grating and form fringes at infinity, as in the case of the beams $I_0$ and $II_0$.

For demonstrating that the interferometer described above satisfies the condition, according to which the optical path of the beams remains constant with variation in refraction of the air, it is expedient to demonstrate that:

$$2n(c_1-c_2) = 2n_0 \cdot \Delta x \qquad (14)$$

since the corresponding wave fronts remain in contact with the mirrors. Now $$\frac{c_1-c_2}{\Delta x} = \cos d\varphi + \sin d\varphi \qquad (15)$$

and $$n = n_0 + dn \qquad (16)$$

thus $$\frac{n}{n_0} = 1 + \frac{dn}{n_0} = 1 - d\varphi \qquad (17)$$

and thus $$\frac{n(c_1-c_2)}{n_0 \Delta x} = (1-d\varphi)(\cos d\varphi + \sin d\varphi)$$

$$= \cos d\varphi + \sin d\varphi - (\cos d\varphi + \sin d\varphi)d$$

$$= 1 - \frac{d\varphi^2}{2!} + d\varphi - d\varphi + \frac{d\varphi^3}{3!} + d\varphi^2 \cdots$$

$$= 1 + 0(d\varphi^2) \qquad (18)$$

The relation (14) is thus satisfied to the first order.

In the second embodiment which is represented in FIG. 2, the apparatus differs from the embodiment described above by the fact that it comprises a prism 9 and a grating 10 which respectively form the said refraction device and the said collimator. The prism 9 is thus intended to fulfil the first function of the grating 2. As the other elements of the apparatus shown in FIG. 2 are identical with the corresponding elements of FIG. 1, they are given the same reference numerals in both figures.

The prism 9 is formed of a transparent material, for example an appropriate glass, having substantially constant optical characteristics in the range of variations in the ambient temperature and pressure which is visualised for the functioning of the apparatus.

Furthermore, so that the prism 9 gives the required refraction effect, that is to say, so that it produces a refracted main beam $L_p$ leaving firstly at an angle $\beta$ and falling on the mirror 3 at an angle of incidence $\varphi_0$ of 45° when the refractive index is at its mean value $n_0$ and, secondly, at an angle $\beta + d\beta$, of which the deviation $d\beta (=d\varphi)$, in radians and change of sign, is equal to the relative deviation of the index $n$, the prism 9 is arranged in such a way that the following equation is satisfied $$\frac{\sin \gamma \left(\frac{n_p}{n_0}\right)^2}{\cos \beta \sqrt{\left(\frac{n_p}{n_0}\right)^2 - \sin^2 \alpha}} = 1 \cdots \quad (19)$$

in which:

$\gamma$ is the angle included between the incidence face $i_9$ and the exit face $s_9$ of the prism 9 (see FIG. 2), $\beta$ is the exit angle of the refracted main beam $L_p$, $\alpha$ is the angle of incidence on the face $i_9$ of the beam L emitted by the laser 1, $n_p$ is the mean value of the refractive index of the material from which the prism 9 is made, $n_0$ is the mean value of the refractive index of the air.

It has been mentioned that the material of the prism 9 must have constant optical characteristics, that is to say, $n_p$=constant. Thus, the appropriate choice of the angles $\gamma$, $\alpha$ and $\beta$, for a given value $n_0$, makes it possible for the Equation 19 indicated above to be fulfilled.

In view of the fact that the prism 9 and the grating 10 together serve exactly the same functions as the grating 2 of FIG. 1, the functioning of the two apparatus as described above is exactly the same. The explanations given above as regards the paths of the respective beams in respect of the apparatus according to FIG. 1 thus also apply in the case of the apparatus according to FIG. 2.

We claim:

1. In an apparatus for measuring lengths by optical interferometry having means for producing a main beam of collimated monochromatic light; a fixed planar semi-transparent mirror, receiving said main beam at an angle of incidence of 45°, for transmitting one part of said main beam along a linear path through air and reflecting another part of said main beam through air; a mirror assembly, movable along said linear path in accordance with the distance to be measured and arranged to reflect said one transmitted part of said main beam; an optical system for causing said one part reflected by said movable mirror assembly and said other part reflected by the fixed mirror to converge to a point; and means for detecting and counting interference fringes formed at said point, an improvement which comprises:

(a) light dispersion means directing said main beam towards said semi-transparent mirror at an angle of incidence of 45° for a given mean value of the refractive index of air, the latter dispersion means causing said angle of incidence to deviate with respect to 45° for other values of said refractive index, such that the deviation of said angle, expressed in radians and with change of sign, is equal to the relative variation of said refractive index with respect to said given mean value thereof;

(b) said movable mirror assembly comprising two plane mirrors, one parallel to said fixed mirror and the other perpendicular thereto, said one mirror being arranged to receive said one part of said beam and reflect it onto said other mirror, whereby to return said one part of the beam parallel to itself through air;

(c) a collimator arranged to receive both said other part of the beam from said fixed mirror and said one part of the beam from said other mirror of the mirror assembly, said collimator having a plane of collimation parallel to the plane of said fixed mirror, such that the parallel beam parts leaving said collimator perpendicular to said fixed mirror are directed towards said optical system for convergence to said point.

2. Apparatus according to claim 1, in which said dispersion means is a plane diffraction grating disposed parallel to said fixed mirror and arranged to receive at normal incidence the beam from said means which produces the main beam and to emit the diffracted main beam at an angle of 45° to the normal to the plane of the grating for said given mean value of the refractive index of air.

3. Apparatus according to claim 1, in which the beam producing means is a laser effect generator.

4. Apparatus according to claim 3, in which said generator is of the Ne-He gas type.

5. Apparatus according to claim 1, in which said collimator comprises a plane grating disposed parallel to said fixed mirror.

6. Apparatus according to claim 5, in which said dispersion means comprises one part and the collimator another part of the same grating.

7. Apparatus according to claim 1, including a compensating plate interposed between said semi-transparent fixed mirror and said collimator and having the same optical characteristics as the transparent part of said fixed mirror causing the said other reflected part of the main beam to be subjected to the same modification in its optical path as that of said one transmitted part.

References Cited

UNITED STATES PATENTS 3,145,251  8/1964  Woodson _____ 356—110

OTHER REFERENCES

Stroke, George W., "Interferometry With Rotation-Insensitive 'Corner-Cube' Systems and Lasers," JOSA, vol. 55, No. 3, March 1965, pp. 330–331.

RONALD L. WIBERT, Primary Examiner

T. MAJOR, Assistant Examiner